United States Patent
Pande et al.

(10) Patent No.: US 11,171,937 B2
(45) Date of Patent: Nov. 9, 2021

(54) CONTINUOUS GUEST RE-AUTHENTICATION SYSTEM

(71) Applicant: Target Brands, Inc., Minneapolis, MN (US)

(72) Inventors: Amit Pande, Ames, IA (US);
Sarasadat Amini, Chicago, IL (US);
Satyajit Vishram Gupte, Sunnyvale, CA (US)

(73) Assignee: TARGET BRANDS, INC., Minneapolis, MN (US)

( * ) Notice: Subject to any disclaimer, the term of this patent is extended or adjusted under 35 U.S.C. 154(b) by 363 days.

(21) Appl. No.: 15/990,572

(22) Filed: May 25, 2018

(65) Prior Publication Data
US 2019/0364027 A1 Nov. 28, 2019

(51) Int. Cl.
*H04L 29/06* (2006.01)
*G06F 21/31* (2013.01)

(52) U.S. Cl.
CPC ............ *H04L 63/08* (2013.01); *G06F 21/31* (2013.01); *G06F 21/316* (2013.01); *H04L 63/10* (2013.01)

(58) Field of Classification Search
CPC ......... H04L 63/08; H04L 63/10; G06F 21/31; G06F 21/316; G06F 2221/2139; H04W 12/06
See application file for complete search history.

(56) References Cited

U.S. PATENT DOCUMENTS

| | | | |
|---|---|---|---|
| 9,547,760 B2 * | 1/2017 | Kang | G10L 17/10 |
| 10,075,846 B1 * | 9/2018 | Acar | H04L 63/0861 |
| 2010/0146592 A1 * | 6/2010 | Gamare | H04L 41/0695 726/4 |
| 2011/0161506 A1 * | 6/2011 | Dickerson | H04L 67/14 709/228 |
| 2012/0252411 A1 | 10/2012 | Johnsgard et al. | |
| 2013/0102283 A1 | 4/2013 | Lau et al. | |
| 2013/0133055 A1 | 5/2013 | Ali et al. | |
| 2014/0002847 A1 * | 1/2014 | Mizuno | G06K 15/4095 358/1.14 |
| 2015/0242601 A1 * | 8/2015 | Griffiths | G06F 21/40 726/5 |
| 2015/0242605 A1 | 8/2015 | Du et al. | |
| 2016/0021238 A1 * | 1/2016 | Abramson | H04W 4/48 455/418 |

(Continued)

OTHER PUBLICATIONS

Amini et al.; DeepAuth: A Framework for Continuous User Re-Authentication in Mobile Apps; CIKM, 8 Pages, 2018.

(Continued)

*Primary Examiner* — Sarah Su
(74) *Attorney, Agent, or Firm* — Merchant & Gould P.C.

(57) ABSTRACT

Methods and systems for authenticating and continuously re-authenticating users are disclosed. Most software applications executing on mobile devices only require a user to provide identification information (e.g., user ID and password) at the outset of launching the application, and infrequently or never subsequently request user identification information. The methods and systems described herein provide continuous protection of user identities using a combination of touch-based biometric sensor data, motion sensor data, and implicit mobile device data.

16 Claims, 8 Drawing Sheets

(56) References Cited

U.S. PATENT DOCUMENTS

| | | | | |
|---|---|---|---|---|
| 2016/0165036 | A1* | 6/2016 | Leow | H04B 1/385 |
| | | | | 455/557 |
| 2017/0227995 | A1* | 8/2017 | Lee | H04L 63/0892 |
| 2018/0060562 | A1* | 3/2018 | Waltermann | G06F 21/6218 |
| 2018/0077146 | A1* | 3/2018 | Lonas | G06N 5/022 |
| 2018/0189794 | A1* | 7/2018 | Campos | H04W 48/18 |
| 2019/0079782 | A1* | 3/2019 | Goldberg | H04L 67/2823 |
| 2019/0080066 | A1* | 3/2019 | Van Os | G06F 21/32 |

OTHER PUBLICATIONS

Cortes et al.; Support-Vector Networks; Machine Learning 20 (Kluwer Academic Publishers, Boston), pp. 273-297; 1995.
Hochreiter et al.; Long Short-Term Memory; Neural Computation 9 (Massachusetts Institute of Technology), pp. 1735-1780; 1997.
Koch et al.; Siamese Neural Networks for One-shot Image Recognition (Proceedings of the 32nd International Conference on Machine Learning—Lille France, JMLR: W&CP vol. 37, 8 Pages, 2015.
Andy Liaw and Matthew Wiener; Classification and Regression by randomForest (R news 2.3); 5 Pages, Dec. 2002.
Friedman, Jerome H., Stochastic gradient boosting; Computational Statistics & Data Analysis 38; pp. 367-378; 2002.
"Active user Authentication for Mobile Devices" a conference paper published in 2012 describes "active authentication" which is defined as continuous authentication during an active session of a mobile device. The paper describes the drawbacks of conventional authentication schemes that do not require user re-authentication for continuous usage of the devices. Accordingly, attackers can target a post-authentication session. In this paper, active authentication for personal mobile devices was studied a biometrics-based active authentication system is proposed, Sui et al. Wireless Algorithms, Systems, and Applications. WASA 2012. Lecture Notes in Computer Science, vol. 7405.
"Continuous User Authentication on Mobile Devices: Recent Progress and Remaining Challenges" an article provided in IEEE Signal Processing Magazine published in Jul. 2016 describes the concerns of security and privacy of mobile devices. The article focuses on continuous authentication systems (active authentication systems) in which users are continuously monitored after initial access to the mobile device, Patel et al.

* cited by examiner

CONTINUOUS GUEST RE-AUTHENTICATION SYSTEM

TECHNICAL FIELD

The present disclosure relates generally to methods and systems for user authentication and continuous user re-authentication. More particularly, the present disclosure describes a system architecture for authenticating and continuously re-authenticating users using a software application using mobile sensor data.

BACKGROUND

Mobile applications often perform user authentication at the launch of the application from a mobile device. User authentication is typically only discussed in the context of initial application startup. In some cases, security policies set by the mobile phone or the software application require entry of user identification information only on the initial launch of the application. Thereafter, user authentication may be infrequently and sometimes never subsequently performed. Without re-performing user authentication, an unauthorized user may access sensitive information on the user's mobile device if the user's device is left unlocked and unattended or even hacked. Such unauthorized access may lead to unauthorized use of the application, purchases, settings changes, and identity theft.

SUMMARY

In summary, the present disclosure relates to methods and systems for authenticating and continuously re-authenticating users using a software application via touch-based biometric and mobile sensor data. Various aspects are described in this disclosure, which include, but are not limited to, the following aspects.

In one aspect, a method of generating an authentication feature vector as used by a continuous re-authentication system for authenticating and re-authenticating an authorized user of an application operating on a mobile device, the method comprising: receiving sensor data from the mobile device, wherein the sensor data includes data from at least one sensor associated with the mobile device; processing the sensor data; generating the authentication feature vector from the processed sensor data; and providing the authentication feature vector to authorize a user of the application.

In another aspect, a method of authenticating and re-authenticating an authorized user of an application operating on a mobile device is disclosed. The method comprises: receiving sensor data from the mobile device, wherein the sensor data includes data from at least one sensor associated with the mobile device; processing the sensor data; generating a feature vector from the processed sensor data; obtaining an authentication feature vector associated with the authorized user of the application; comparing the feature vector with the authentication feature vector; and based on a determination that the feature vector sufficiently correlates to the authentication feature vector, continuing operation of the application.

In yet another aspect, a non-transitory computer-readable storage medium comprising computer-executable instructions is disclosed. When executed by a programmable circuit of a computing system, the instructions cause the computing system to perform: receiving sensor data from the mobile device, wherein the sensor data includes data from at least one sensor associated with the mobile device; processing the sensor data; generating a feature vector from processed sensor data; obtaining an authentication feature vector associated with the authorized user of the application; comparing the feature vector with the authentication feature vector; and based on a determination that the feature vector sufficiently correlates to the authentication feature vector, continuing operation of the application.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
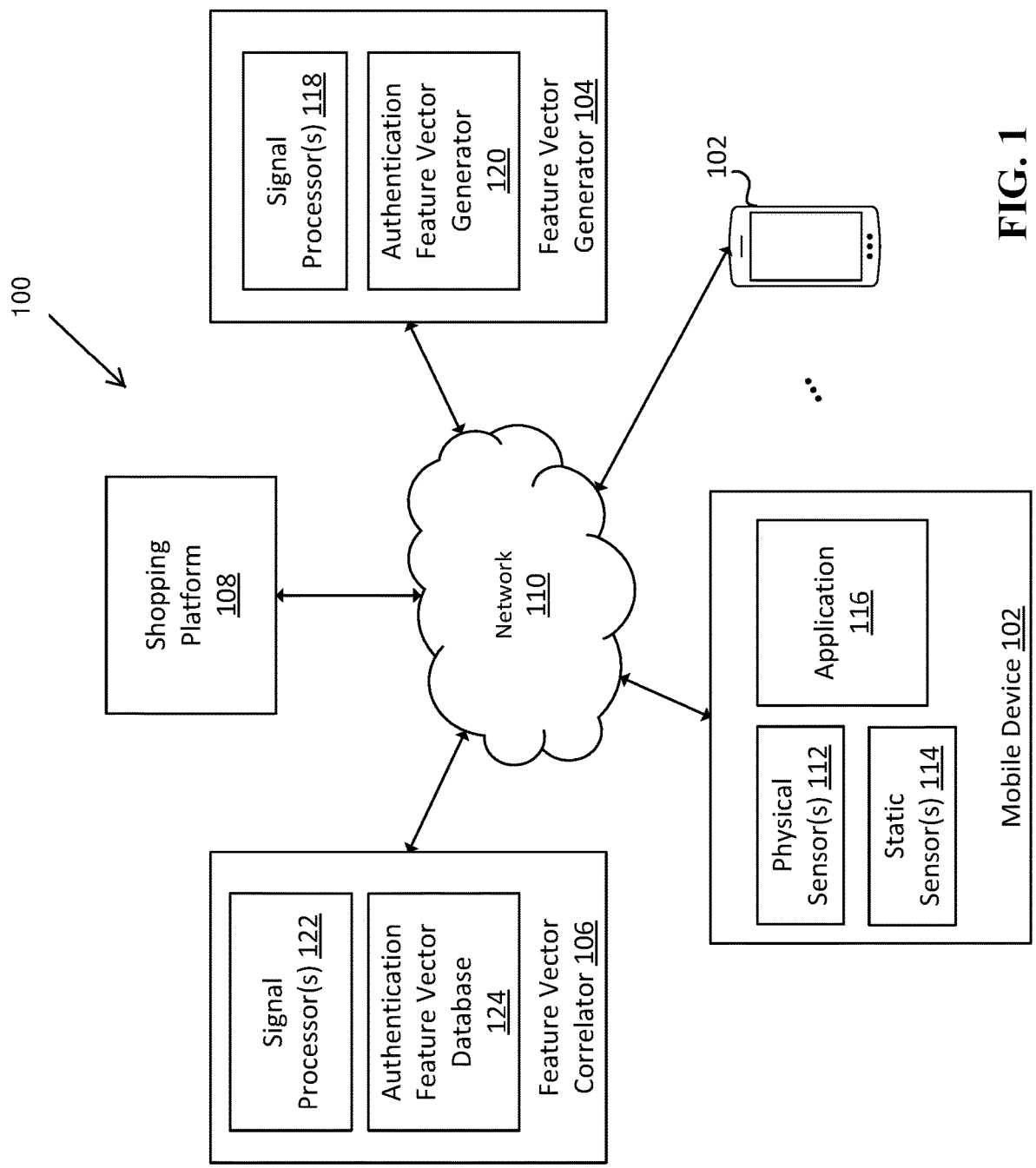
FIG. 1 illustrates a schematic diagram of an example system architecture for authenticating and continuously re-authenticating users using a software application.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the present disclosure relates to methods and systems for authenticating and continuously re-authenticating users. As described herein, software applications executing on mobile devices typically only require a user to provide authentication information (e.g., user ID and password) when the application is initially launched. The methods and systems described herein provide continuous protection of user identities. The methods and systems protect sensitive user information by initially authenticating the user and continuously re-authenticating the user during operation of the application. This continuous re-authentication is performed using mobile sensor data, including a combination of touch-based biometric sensor data, motion sensor data, and implicit mobile device data. In some embodiments, application data is also used. This data is analyzed and used to understand the authorized user's behavior while operating the application. This baseline understanding of the authorized user's behavior is compared to data obtained during subsequent uses of the application to determine whether an unauthorized user has gained access to the application. Accordingly, the continuous re-authentication ensures the application is accessed by the authorized user, and in the event of access by an unauthorized user, the system will automatically log the user out of the application. Such heightened, continuous security enables enhanced protection of sensitive information.

FIG. 1 illustrates a schematic diagram of an example system architecture of a continuous re-authentication system 100 for authenticating and continuously re-authenticating users using a software application.

The continuous re-authentication system 100 includes one or more mobile devices 102, a feature vector generator 104, and a feature vector correlator 106, which communicate over a network 110. The network 110 can be any of a variety of types of public or private communications networks, such as the Internet. In this example, the continuous re-authentication system 100 also communicates with a shopping platform 108. In one example, the shopping platform 108 may host a shopping website for a retail store.

In some examples, the mobile device 102 can be any mobile network-connected device such as, for example, smartphones, cell phones, tablets, and other mobile devices capable of connecting to the Internet through wireless or wired connections. In this example, the mobile device 102 further includes one or more physical sensors 112, one or more static elements 114, and an application 116. The mobile device 102 hosts an application 116, which may be associated with the shopping platform 108. In such an example, the application 116 may be associated with the retail store having a website hosted by the shopping platform 108. In one example, the application 116 is a shopping application that stores, on the mobile device 102 or in a database accessible by the application 116, user information such as user identification information (e.g., name, address, phone number) and account information (e.g., credit card information, purchase history). The application 116 may further track and store user behavior information, which may include, for example, the authorized user's preferred products, the authorized user's previously purchases goods, the way in which the user shops and browses products, and the way in which the user interacts with the application 116. The application 116 may be accessed by the user of the mobile device 102 to browse and purchase items sold on the shopping platform 108. The application 116 is described in further detail with reference to FIG. 2.

The mobile device 102 further includes one or more physical sensors 112 and one or more static elements 114. As described herein, data derived from the physical sensors 112, static elements 114, and the application 116 may be used to track, understand, and identify the authorized user's behavior while operating the application, which, in one example, is described by an authentication feature vector. This authentication feature vector is then used to authenticate and continuously re-authenticate a user during operation of the application 116. The physical sensors 112 and the static elements 114 are described in further detail with reference to FIG. 2.

This example continuous re-authentication system 100 further includes a feature vector generator 104. The feature vector generator 104 includes one or more signal processors 118 and an authentication feature vector generator 120. In some examples, the signal processors 118 process the unique user data gathered from the physical sensors 112 and static elements 114 of the mobile device 102. The authentication feature vector generator 120 uses that processed data to generate a feature vector (although the present disclosure refers to it as a feature vector, it may also be referred to as an "embedding") for each user. The feature vector uniquely describes the authorized user's behavior while operating the application. In particular, the feature vector is based on a sampling of data from the user's interaction with the mobile device 102, the user's interaction with the application, and the device's interaction with its surroundings. The feature vector generator 104 is further described with reference to FIG. 3.

In this example, the continuous re-authentication system 100 further includes a feature vector correlator 106. The feature vector correlator 106 includes one or more signal processors 122 and an authentication feature vector database 124. In some examples, the feature vectors generated by the feature vector generator 104 may be stored in the authentication feature vector database 124. Although this example depicts the authentication feature vector database 124 as being separate from the feature vector generator 104, in other embodiments, the authentication feature vector database 124 may be included in the feature vector generator 104. As described with reference to the feature vector generator 104, the signal processors 118 are used to process unique user data gathered from the physical sensors 112 and static elements 114 of the mobile device in order to generate a feature vector for each user. Similarly, the signal processors 122 of the feature vector correlator 106 process unique user data gathered from the physical sensors 112 and static elements 114 of the mobile device as the user operates the application. As such, the signal processors can also generate a feature vector for that particular user based on data received from the mobile device as the user operates the application which are compared to the authentication feature vector stored in the authentication feature vector database 124. Thus, the feature vector correlator 106 can perform re-authentication of a user of the application 116 as the authorized user. Although the feature vector generator 104 and feature vector correlator 106 are shown as two separate computing entities, each having one or more signal processors 118, 122, respectively, it is understood that the feature vector generator 104 and feature vector correlator 106 may be included as one computing entity within the continuous re-authentication system 100.

Figure 2:
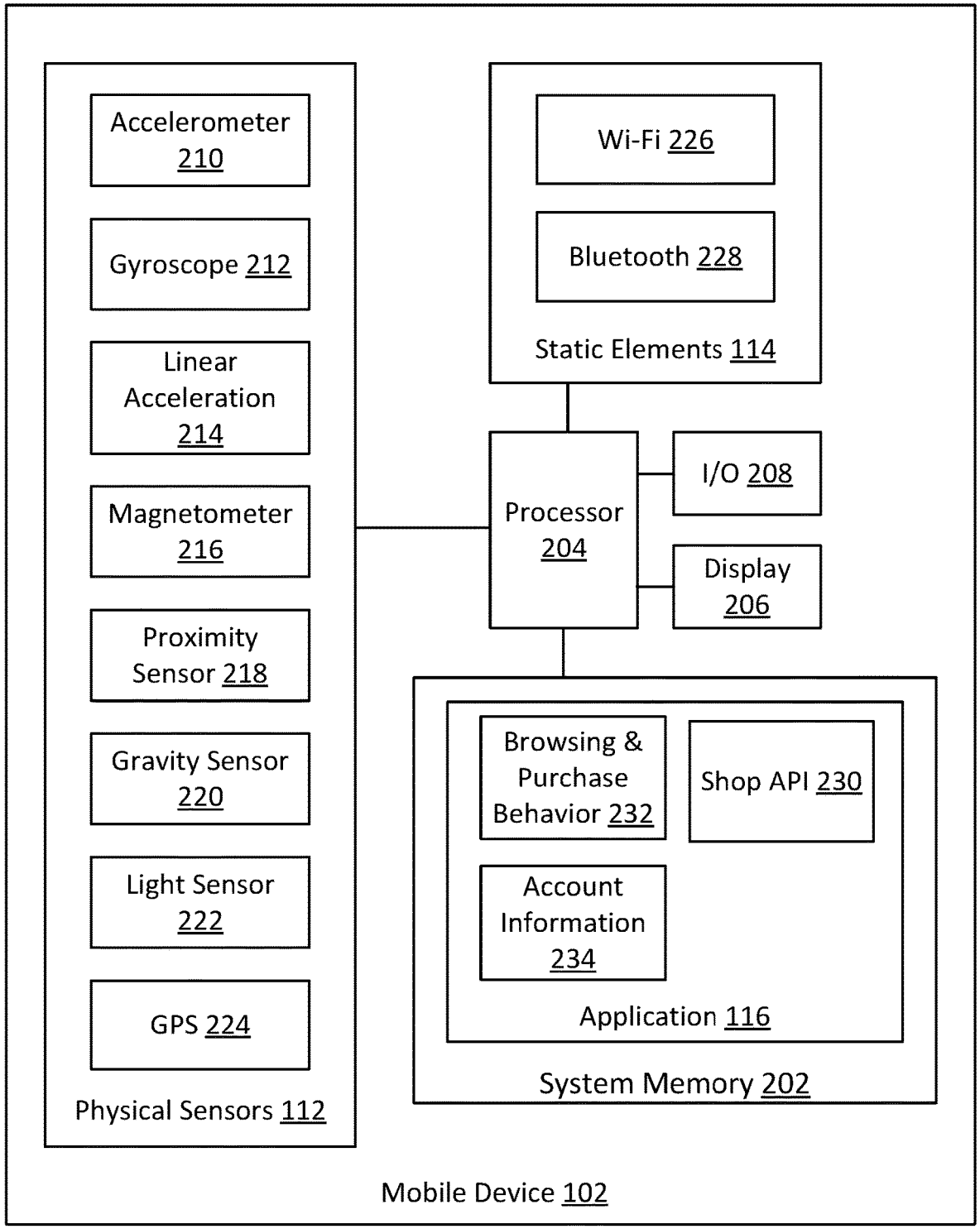
FIG. 2 illustrates a schematic diagram of the example mobile device described in the example system shown in FIG. 1.

Referring now to FIG. 2, which illustrates a schematic diagram of the example mobile device 102 described in the example system shown in FIG. 1.

In the example embodiment shown, the mobile device 102 includes a system memory 202 operatively connected to a processor 204. The mobile device 102 also includes a display 206 and an input/output device 208, each also operatively coupled to the processor 204 and system memory 202. The display 206 can be configured to display various information associated with operation of the mobile device 102, which includes operation of the application 116. The mobile device 102 further includes one or more physical sensors 112, one or more static elements 114, and an application 116 also operatively coupled to the processor 204.

The input/output device 208 can be any of a variety of wired or wireless communication interfaces configured to communicate information to and from the shopping platform, as accessed by the application 116. For example, the input/output device 208 can provide, to the application 116, sales information provided by the shopping platform, wherein sales information may include information about goods for sale, corresponding prices of those goods, description information relating to the goods, customer reviews, etc. In another example, the input/output device 208 can provide, to the shopping platform purchase information, wherein purchase information may include information about goods purchased, credit card information, gift card information, shipping information, billing information, etc.

The input/output device 208 can also provide authentication information to the feature vector generator 104 and the feature vector correlator 106. For example, the input/output device 208 can provide data gathered from the physical sensors 112 and the static elements 114 to the feature vector generator 104 in order to generate a particular user's authentication feature vector. The input/output device 208 can also send such data to the feature vector correlator 106 so as to authenticate and continuously re-authenticate the user, based at least in part on comparing the data to the one or more unique authentication feature vectors for each user stored in the authentication feature vector database 124. The input/output device 208 may further send an alert to the application 116, wherein the alert indicates whether, based on a result of the comparison of the data received from one or more of the physical sensors 112 and static elements 114 to the authentication feature vector, an unauthorized user is using the application 116. In response, the application 116 may log out of the mobile device 102 or require the user to provide further credentials in order to access the application 116. If, alternatively, the authorized user is the user accessing the application, the input/output device 208 may not send an alert, or may send a message indicating as that the authorized user is currently accessing the application 116 so that the authorized user may continue to operate the application 116 may on the mobile device 102.

As described herein, the one or more physical sensors 112 and the one or more static elements 114 are used to gather data that is unique to the authorized user of the mobile device 102. In some examples, the gathered data is unique to the way in which the authorized user operates and physically interacts with the mobile device, and even more, the way in which the authorized user operates and physically interacts with the mobile device during operation of the application. Alternatively or additionally, the gathered data may be unique to the mobile device's connections (by way of the static elements). A combination of data gathered from the one or more physical sensors 112 and the one or more static elements 114 is used to generate an authentication feature vector for the authorized user. Thereafter, a combination of such signals is used to initially authenticate the user upon startup of the application 116 and continuously re-authenticate the user during operation of the application 116. In some embodiments, a single signal may be used to authenticate and re-authenticate the user. Alternatively or additionally, multiple signals (from one or more of the physical sensors 112, the static elements 114, or any combination thereof) may be used to authenticate and re-authenticate the user.

In this example, the mobile device 102 includes one or more physical sensors 112. Physical sensors provide data about the device itself and even the environment surrounding the mobile device. In this example, the mobile device 102 includes the following physical sensors 112: an accelerometer 210, a gyroscope 212, a linear accelerator 214, a magnetometer 216, a proximity sensor 218, a gravity sensor 220, and a light sensor 222. It is understood that although particular physical sensors are shown, a mobile device is not limited to only such physical sensors. Other embodiments of the continuous re-authentication system may fewer or more physical sensors not depicted herein.

The accelerometer 210 measures tilt and motion of the mobile device 102, including force applied to the device, in three axes (X, Y, and Z). The accelerometer 210 is also capable of detecting motion gestures (e.g., shaking and swinging) of the mobile device 102. The accelerometer 210 can also be used to determine the orientation of the mobile device 102. In one example, the accelerometer 210 may be used to determine the way in which a user holds the device and how much pressure the particular user applies to the device. For example, the accelerometer 210 may determine the sensitive motion a particular user applies to the mobile device as well as the pressure applied thereto. The accelerometer 210 may also track hand gestures as well—identifying whether a user uses shake and motion gestures to select various options while using the mobile device 102.

The gyroscope 212 measures rotation of the mobile device 102, in three axes (X, Y, and Z). The gyroscope therefore adds additional information to the accelerometer—namely the ability to track rotation of the mobile device 102. Thus, combining the accelerometer 210 and gyroscope 212 enable the ability to track movement along three axes. In one example, the gyroscope 212 allows the continuous re-authentication system to determine that a particular user typically rotates the mobile device 102 in a particular way while operating the application 116.

The linear acceleration sensor 214 measures the linear acceleration movement of the mobile device 102. The linear acceleration sensor 214 discounts the effect of acceleration that is due to gravity, thus the linear acceleration sensor 214 measure the pure acceleration of the mobile device itself. Thus, according to an example, the linear acceleration sensor 214 can track when the mobile device 102 is in motion. Information from the linear acceleration sensor 214 can be used in conjunction with one or more additional sensors to model the particular user's typical interaction while moving with the mobile device 102 during operation of the application 116.

The magnetometer 216 measures the ambient geomagnetic field of the mobile device 102, in three axes (X, Y, and Z). In one example, the magnetometer 216 measures the magnetic orientation of the phone, relative to the three axes. Thus, the magnetometer 216 can identify the position of the mobile device. In one example, the magnetometer 216 allows the continuous re-authentication system to determine that a particular user typically holds the mobile device 102 at a 39-degree angle while operating the application 116.

The proximity sensor 218 measures the proximity of an object relative to the display 206 of the mobile device 102. Accordingly, the proximity sensor 218 may be used by the continuous re-authentication system to detect how close a user's face is typically positioned relative to the display while operating the application 116.

The gravity sensor 220 measures the force of Earth's gravity applied to the mobile device 102, in three axes (X, Y, and Z). The gravity sensor 220 can be used in conjunction with the gyroscope 212 to measure the rotation of the mobile device 102. Accordingly, the gravity sensor may allow the continuous re-authentication system to determine that a particular user typically rotates the mobile device 102 in a particular way while operating the application 116.

The light sensor 222 measures the ambient level of light surrounding the mobile device 102. In one example, the light sensor 222 can be used by the continuous re-authentication system to determine ambient light levels that are typically measured while the user operates the application 116.

The global positioning sensor (GPS) 224 measures the position of the device, based on satellite information. Accordingly, by determining the exact location of the mobile device, the GPS sensor 224 can be used by the continuous re-authentication system to determine whether the mobile device 102 is in a typically used location.

In this example, the mobile device 102 also includes one or more static elements 114. Static elements provide data about the mobile device's connections, for example. In particular, the static elements may provide an indication of the mobile device's connections as it relates to the authorized user's behavior. For example, the authorized user may typically access the application 116 at a home Wi-Fi connection. Alternatively or additionally, the authorized user may typically operate the application 116 while connected via Bluetooth to a particular device. In this example, the mobile device 102 includes the following static elements 114: a Wi-Fi chip 226 and a Bluetooth chip 228. It is understood that although particular static elements are shown, a mobile device is not limited to only such static devices. Other embodiments of the continuous re-authentication system may fewer or more static elements not depicted herein.

The Wi-Fi chip 226 enables the mobile device 102 to connect to wireless internet connections. Accordingly, the Wi-Fi chip 226 can be used by the continuous re-authentication system to determine whether the mobile device 102 is connected to a known Wi-Fi network.

Similarly, the Bluetooth chip 228 enables the mobile device 102 to connect to Bluetooth devices. Accordingly, the Bluetooth chip 228 can be used by the continuous re-authentication system to determine whether the mobile device 102 is connected to known devices.

In this example, the system memory 202 includes application 116. The application 116 includes a shopping API 230, browsing and purchase history 232, and account information 234. The shopping API 230 exposes the application 116 to the shopping platform 108, shown and described with reference to FIG. 1. The shopping API 230 enables the application 116 to display and sell items sold on the shopping platform 108. The application 116 further stores browsing and purchase behavior 232, which tracks the authorized user's interactions with the application 116. The browsing and purchasing behavior 232 may track, for example, how long the user typically views a particular product, how long a user waits to purchase an item, whether the user views images of the product, whether the user reads customer reviews, etc. The browsing and purchasing behavior 232 may also track the types of goods the authorized user typically views, or the authorized user's preferred products. As further illustrated, the application 116 may further store account information 234, which may include sensitive information relating to the authorized user. As described herein, an advantage of the continuous re-authentication system is the enhanced and continuous protection of such sensitive information belonging to the authorized user.

Figure 3:
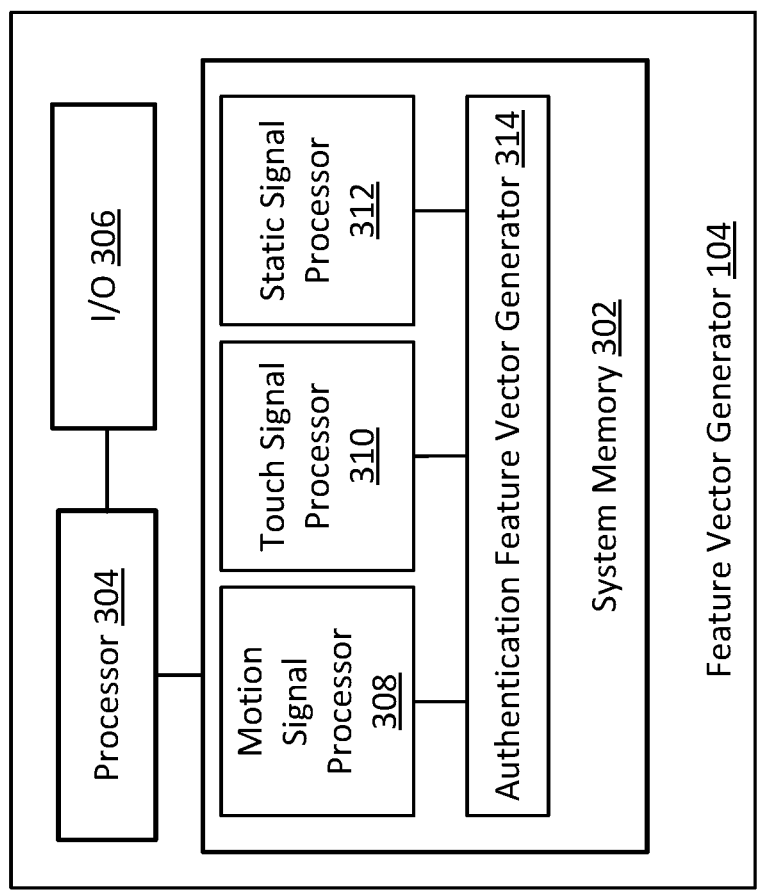
FIG. 3 illustrates a more detailed view of the example feature vector generator shown and described in FIG. 1.

Referring now to FIG. 3, illustrated is a more detailed view of the example feature vector generator 104 described in FIG. 1.

As described herein, the continuous re-authentication system generates an authentication feature vector—that uniquely describes the authorized user's behavior while operating the application—is used to authenticate and continuously re-authenticate a user as the authorized user during operation of the application. In particular, the continuous re-authentication system gathers data from the one or more physical sensors and static elements to understand and identify the authorized user's typical behavior while interacting with the mobile device, and in particular, while operating the application. The continuous re-authentication system may further gather data relating to the user's shopping and browsing behavior while using the application. Based on tracking such typical interactions with the mobile device and the application, the feature vector generator 104 generates an authentication feature vector that is unique to the authorized user and describes the authorized user's behavior while operating the application. As will be described in further detail herein, the authentication feature vector is used to authenticate and continuously re-authenticate a user of the application as the authorized user.

As an example, the feature vector generator 104 of the continuous re-authentication system may receive data from one or more physical sensors, wherein the data describes the way in which the authorized user physically interacts with the mobile device, including, for example, the angle at which the authorized user holds the mobile device, while stationary and while walking. In another example, the physical sensors may track the typical amount of pressure the authorized user applies to the mobile device while using the application. The physical sensors may further track how close the mobile device is held to the authorized user's face while using the application. The physical sensors may track the amount of ambient light typically associated with the authorized user's surroundings. In another example, the static elements 114 may be used to identify the authorized user's typical Wi-Fi and Bluetooth connections. The feature vector generator 104 may further collect information from the application itself regarding the authorized user's browsing and purchasing behavior. For example, the feature vector generator 104 may receive behavior indicative of how long the authorized user typically views a particular product, how long the authorized user waits to purchase an item after viewing the item, whether the authorized user views alternative images of the product, whether the authorized user reads customer reviews, etc. The feature vector generator 104 collects such sensor and application data to generate the unique authentication feature vector. Although a few examples are described, it is understood that more or fewer sensor data may be collected in order to generate the unique authentication feature vector. Furthermore, the feature vector generator 104 may use one or more of these signals obtained from the physical sensors and the static elements to generate a unique authentication feature vector.

In the example embodiment shown, the feature vector generator 104 includes a system memory 302 operatively connected to a processor 304. The example feature vector generator 104 also includes an input/output device 306 also operatively coupled to the processor 304 and system memory 302. The feature vector generator 104 further includes a motion signal processor 308, a touch signal processor 310, a static signal processor 312, and an authentication feature vector generator 314.

The example motion signal processor 308, the touch signal processor 310, and the static signal processor 312 each process measurements taken from the one or more physical sensors, the static components of the mobile device, and the application. In one example, the motion signal processor 308 processes measurements received from the one or more physical sensors that detect movement of the mobile device. For example, the motion signal processor 308 receives measurements from physical sensors such as the accelerometer, gyroscope, linear acceleration sensor, magnetometer, gravity sensor, and the GPS sensor. In one example, the touch signal processor 310 processes measurements received from the one or more physical sensors that detect pressure applied to the mobile device. For example, the touch signal processor 310 receives measurements from physical sensors such as the proximity sensor, the gravity sensor, and the fingerprint touch sensor. In another example, the static signal processor 312 processes measurements received from static elements in the mobile device. For example, the static signal processor 312 processes signals received from the Wi-Fi chip and the Bluetooth chip. As will be described herein, each of the signal processors filter, process, normalize, and combine the gathered measurements so the authentication feature vector generator 314 can use such processed data to generate a unique authentication feature vector for each authorized user. Although the motion signal processor 308, the touch signal processor 310, and the static signal processor 312 are illustrated as individual components, it is understood that these processors may be combined into a single signal processor.

In one example, the motion signal processor 308, the touch signal processor 310, and the static signal processor 312 each filter measurements taken from the sensors to obtain one or more clean signals. In this example, the authentication feature vector generator 314 receives the processed signals from the motion signal processor 308, the touch signal processor 310, and the static signal processor 312 (collectively referred to as the "signal processors"). Different sensors may have different sampling rates. In some examples, the sampling rate can be set or, after collection of the sensor data, the sensor data may be resampled at a set sampling rate. Regardless of the sampling rate, in one example, the collected measurements from the one or more physical sensors and the one or more static elements are synchronized. Then, the data is segmented into smaller, fixed-size windows. Segmenting the data into fixed-size windows allows the data to be input into classifiers (e.g., support vector machines [SVM]) that may require data inputs of the same length. These classifiers are learning models that are trained with both valid authorized user data and invalid data so as to generate the authentication feature vector, which accurately describes the authorized user's behavior while operating the application. In some embodiments, the segmented, fixed-size windows do not overlap and in other embodiments, the segmented fixed-size windows overlap. In one example, overlapping windows better detect the authorized user's behavioral pattern. The feature vector generator 104 does not know the beginning or the end of data and a sequential number of measurements may reveal a pattern indicative of the user's behavior. Thus, overlapping windows increase the chances of detecting such patterns in the obtained measurements. After the filtering, data segmenting, and synchronization of the data, the feature vector generator 104 generates an n-dimensional feature vector in the time domain.

For each segmented time window, the sensor data is transformed into the frequency spectrum using fast Fourier Transforms (FFT) such that an authentication feature vector in the frequency domain can be obtained. In this example, the authentication feature vector in the frequency domain is symmetric so only half the vector is considered. Accordingly, the authentication feature vector represents an n/2-dimensional vector of features that represent the features derived from the sensors, static elements, and in some embodiments application data. Accordingly, the authentication feature vector is unique to the particular authorized user, and describes the authorized user's interactions with the mobile device 102 while operating the application executing thereon.

As described herein, the feature vector generator 104 further trains the authentication feature vector (e.g., using SVM, LSTM, RNN, Random Forest, Gradient Boosted Trees, Siamese network or other classifiers) with valid data (e.g., sensor data obtained from the mobile device while the authorized user uses the application) and invalid data (e.g., sensor data obtained from the mobile device while another user uses the application). This validation step is performed to find a threshold defining the closeness of feature vectors that belong to the authorized user. As will be described in further detail with reference to FIG. 4, a feature vector generated during operation of the application that is farther than the threshold to the authorized user's authentication feature vector indicates that user is an unauthorized user. In some embodiments, the authentication feature vector is updated over time as the authorized user's behavior changes over time.

Figure 4:
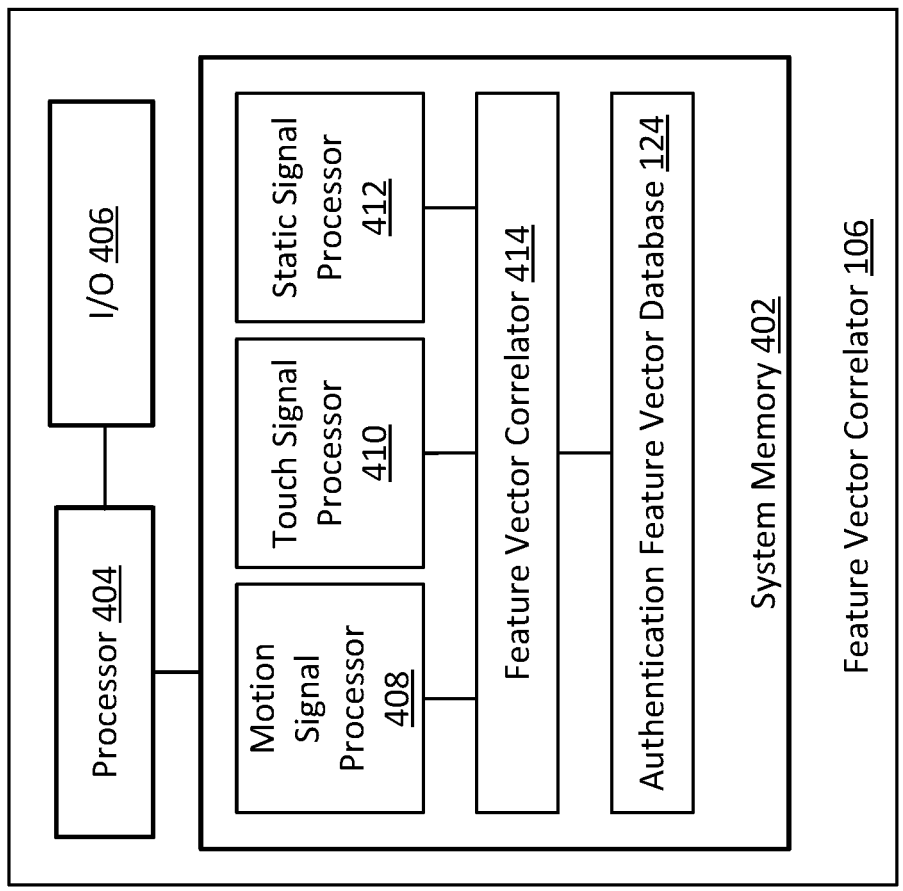
FIG. 4 illustrates a more detailed view of the example feature vector correlator shown and described in FIG. 1.

Referring now to FIG. 4, illustrated is a more detailed view of the example feature vector correlator shown and described in FIG. 1.

As described herein, the continuous re-authentication system continuously re-authenticates the user of the application operating on the device. Such continuous re-authentication ensures the application is accessed by the authorized user. Continuous re-authentication provides heightened security, which enables enhanced protection of sensitive information.

During use of the application, the continuous re-authentication system continuously receives data from the one or more physical sensors, static elements, and application. The feature vector correlator 106 processes those signals to generate a feature vector for the user operating the application. The feature vector is compared to the authentication feature vector for the particular authorized user of that application, wherein the authentication feature vector was generated and trained by the feature vector generator 104. The comparative analysis is first performed at the launch of the application to initially verify the authorized user is in fact operating the application. Thereafter, the feature vector correlator 106 continuously receives data from the one or more physical sensors, static elements, and application to continuously re-authenticate the user via comparative analysis with the authentication feature vector uniquely generated for that authorized user.

In the example embodiment shown, the feature vector correlator 106 includes a system memory 402 operatively connected to a processor 404. The example feature vector correlator 106 also includes an input/output device 406 also operatively coupled to the processor 404 and system memory 402. The system memory 402 further includes a motion signal processor 408, a touch signal processor 410, and a static signal processor 412. The system memory 402 also includes a correlator 414 operatively connected to the signal processors and an authentication feature vector database 124. The authentication feature vector database 124 stores each authentication feature vector generated by the feature vector generator 104.

Similar to the signal processors described with reference to FIG. 3, the motion signal processor 408, the touch signal processor 410, and the static signal processor 412 each process signals received from the one or more physical sensors, the static components of the mobile device, and the application as the user operates the application. In one example, the motion signal processor 408 processes signals received from the one or more physical sensors that detect movement of the mobile device. For example, the motion signal processor 408 receives data from physical sensors such as the accelerometer, gyroscope, linear acceleration sensor, magnetometer, gravity sensor, and the GPS sensor. In one example, the touch signal processor 410 processes signals received from the one or more physical sensors that detect pressure applied to the mobile device. For example, the touch signal processor 410 receives data from physical sensors such as the proximity sensor, the gravity sensor, and the fingerprint touch sensor. In another example, the static signal processor 412 processes signals received from static elements in the mobile device. For example, the static signal processor 412 processes signals received from the Wi-Fi chip and the Bluetooth chip. Each of the signal processors filter, process, normalize, and combine the gathered data to generate a feature vector, which is described in further detail herein. The feature vector correlator 414 compares the generated feature vector to the authentication feature vector saved in the authentication feature vector database 124 for the authorized user to determine whether the authorized user is in fact operating the application. Although the motion signal processor 408, the touch signal processor 410, and the static signal processor 412 are illustrated as individual components, it is understood that these processors may be combined into a single signal processor.

In one example, the motion signal processor 408, the touch signal processor 410, and the static signal processor 412 each filter all measurements taken from the sensors to obtain one or more clean signals. In this example, the feature vector correlator 414 receives the processed signals from the motion signal processor 308, the touch signal processor 310, and the static signal processor 312 (collectively referred to as the "signal processors"). Similar to the feature vector generator (ref 104 of FIG. 3), the feature vector correlator 106 synchronizes the collected measurements from the one or more physical sensors and the one or more static elements. Then, the data is segmented into smaller, fixed-size windows. After the filtering, segmenting, and synchronizing the measurements, the vector correlator 106 generates an n-dimensional feature vector in the time domain.

For each segmented time window, the sensor data is then transformed into the frequency spectrum using fast Fourier Transforms (FFT) such that a feature vector in the frequency domain can be obtained. This feature vector is generated for the use operating the application at a particular point in time, and is compared to the authentication feature vector for the authorized user of the application to determine whether the use is the authorized user. In particular, the feature vector correlator 414 compares the feature vector to that of the authentication feature vector. If, based on the comparison, the feature vector is farther than a predetermined threshold to the authentication feature vector, the user described by the feature vector is likely not the authorized user. Accordingly, the feature vector correlator 106 may generate a signal indicating a non-authorized user has accessed the application. In such an example, based on receiving the signal from the feature vector correlator 106, the application may log the unauthorized user from accessing the application. If, alternatively, based on the comparison, the feature vector is within the predetermined threshold to the authentication feature vector, the user described by the feature vector is likely the authorized user. Accordingly, the feature vector correlator 106 may generate a signal indicating the authorized user is accessing the application. Alternatively, the feature vector correlator 106 may not generate a signal.

This process is further described with reference to FIG. 5.

Figure 5:
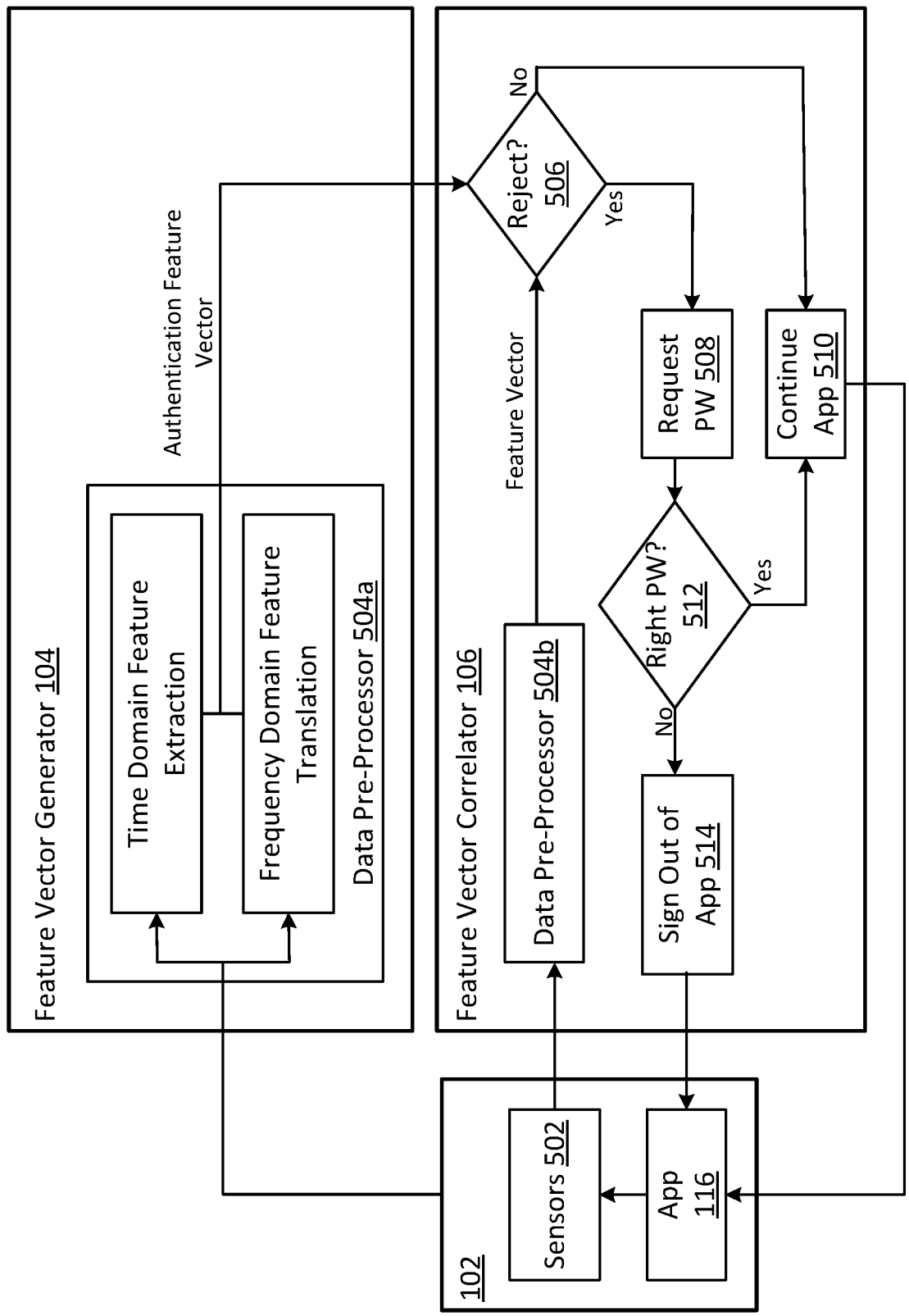
FIG. 5 illustrates an example flow diagram of the authentication and continuous re-authentication system.

Now referring to FIG. 5, illustrated is an example flow diagram of the authentication and continuous re-authentication system.

As illustrated, the mobile device 102 includes physical sensors and static elements (collectively referred to herein as sensors 502) and an application 116. As described herein, the application 116 may be associated with a shopping platform (such as shopping platform 108 shown and described with reference to FIG. 1). The application 116 may be used to browse and purchase items sold on the shopping platform 108, and may further include sensitive information (e.g., password information, credit card information, address information, etc.). The application 116 may further track the authorized user's browsing and purchasing behavior, which may be used to generate the authorized user's authentication feature vector, and may also be used to re-authenticate the user. In this example, the mobile device 102 belongs to an authorized user of the application 116.

As described herein, the continuous re-authentication system generates an authentication feature vector for each authorized user that identifies the user based on one or more of the user's interaction with the mobile device, the mobile device's connections with static elements, and the user's browsing and purchasing behavior. For example, the continuous re-authentication system gathers data from the one or more physical sensors and static elements to identify the authorized user's typical interactions with the mobile device, and in particular, while the authorized user operates the application. The continuous re-authentication system may also analyze the user's browsing and purchasing behavior to re-authenticate the user. After tracking such typical interactions with the mobile device and application, the feature vector generator 104 generates an authentication feature vector that is unique to the authorized user. The unique authentication feature vector is used to authenticate and continuously re-authenticate a user of the application 116 as the authorized user.

As described herein, in order to initially generate an authentication feature vector that describes the authorized user, the sensors 502 and the application 116 send measurements to the feature vector generator 104. The measurements may depict the way in which the authorized user holds the mobile device 102 during operation of the application 116. For example, the sensors 502 may track the angle at which the authorized user holds the mobile device, while stationary and while walking. The sensors 502 may also track the typical amount of pressure the authorized user applies to the mobile device while using the application. The sensors 502 may further track how close the mobile device is held to the authorized user's face while using the application. The sensors 502 may track the amount of ambient light typically associated with the authorized user's surroundings. The sensors 502 may also identify the authorized user's typical Wi-Fi and Bluetooth connections. The application 116 may provide browsing and purchasing behavior to the feature vector generator 104.

The feature vector generator 104 collects such raw sensor data to generate an authentication feature vector that is unique to the authorized user, based on one or more of the authorized user's interactions with the mobile device 102, the mobile device's 102 static interactions with its surroundings, and the authorized user's browsing and purchasing history. In some examples, one or more of these signals are concurrently analyzed so as to uniquely identify the authorized user. As illustrated, the feature vector generator 104 first performs pre-processing on the raw data received from the sensors 502. The data pre-preprocessor 504a samples measurements taken from the sensors 502 and synchronizes those measurements. Thereafter, the data is segmented into fixed-size windows allowing the data to be input into a classifier that can train the authentication feature vector. After the filtering, data segmenting, and synchronization of the measurements, the feature vector generator 104 generates an n-dimensional feature vector in the time domain.

For each segmented time window, the sensor data is transformed into the frequency spectrum using fast Fourier Transforms (FFT) such that an authentication feature vector in the frequency domain can be obtained. In this example, the authentication feature vector in the frequency domain is symmetric so only half the vector is considered. Accordingly, the authentication feature vector represents an n/2-dimensional vector of features that represent the features derived from the sensors, static elements, and in some embodiments, application data. Accordingly, the authentication feature vector is unique to the particular authorized user, and describes the authorized user's interactions with the mobile device 102 while operating the application 116 executing thereon.

As described herein, the continuous re-authentication system continuously re-authenticates the user during operation of the application 116 executing on the mobile device 102. Continuous re-authentication ensures the application is accessed only by the authorized user. Such heightened security enables enhanced protection of sensitive information. Accordingly, during use of the application 116, the continuous re-authentication system continuously receives signals from the sensors 502 and the application 116. The feature vector correlator 106 also performs data pre-processing using a data pre-processor 504b similar to that found in the feature vector generator 104. The data pre-processor 504b therefore generates an n/2-dimension feature vector in the frequency domain that is compared to the generated n-dimension authentication feature vector for the particular authorized user of the application 116. If, at operation 506, it is determined that the feature vector generated by the feature vector correlator 106 matches the unique authentication feature vector for that authorized user (e.g., NO at operation 506), the feature vector correlator 106 generates a signal allowing the authorized user to continue operating the application 116 at operation 510. Alternatively, no signal is generated and the authorized user may continue to use the application 116 at operation 510. If, however, it is determined that the feature vector generated by the feature vector correlator 106 does not match the unique authentication feature vector for that authorized user (e.g., YES at operation 506), in this example the feature vector correlator 106 will, at operation 508, request the user to enter a password. In one example, the continuous re-authentication system will not allow the user to access the application 116 until the correct password is provided.

If the feature vector correlator 106 determines that the correct password was entered (e.g., YES at operation 512), a signal may be generated, allowing the authorized user to continue operating the application 116. If, alternatively, it is determined that an incorrect password is provided (e.g., NO at operation 512), the feature vector correlator 106 will generate a signal that logs the application 116 out of the mobile device 102 at operation 514.

Figure 6:
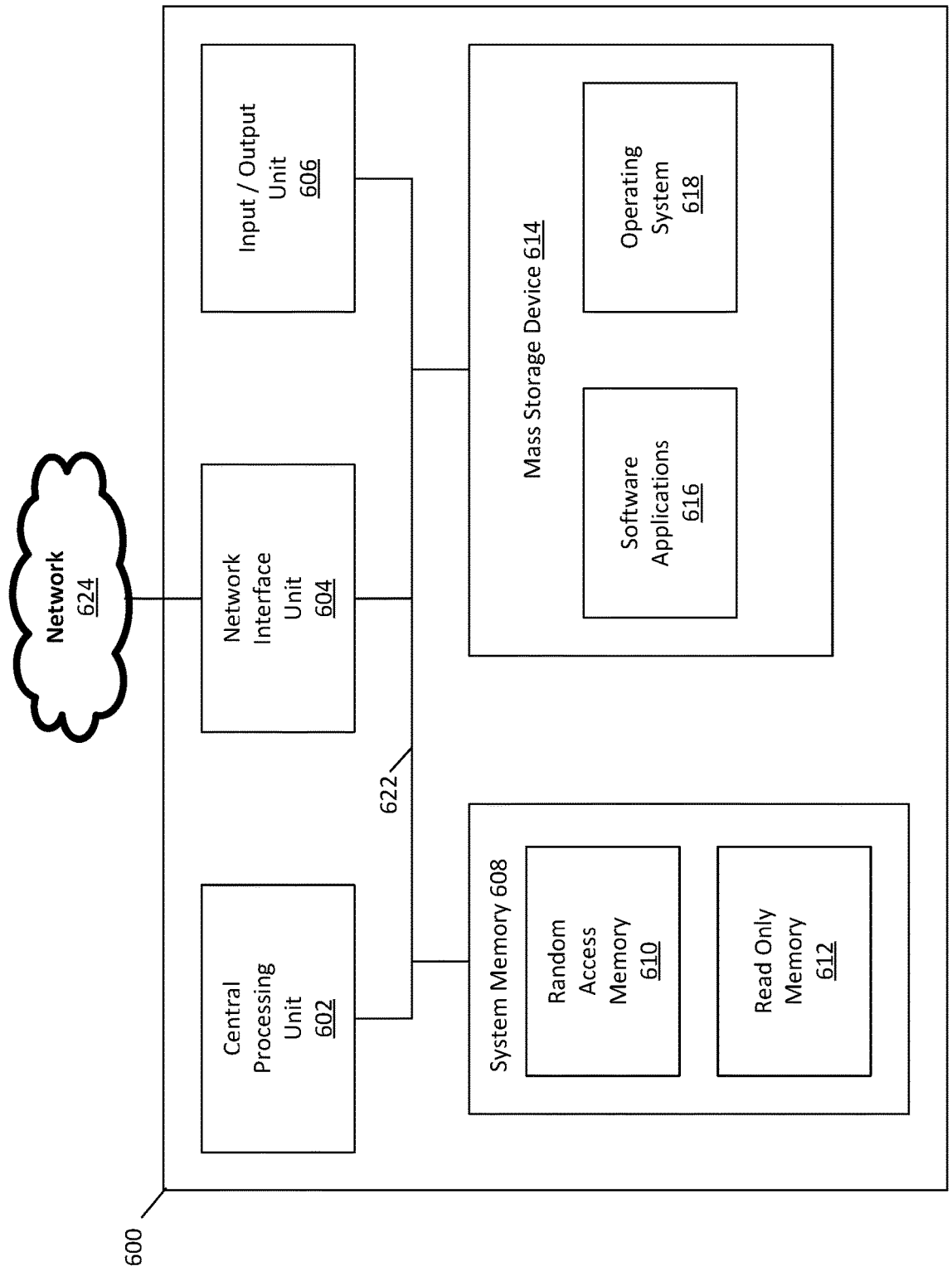
FIG. 6 illustrates an example block diagram of a computing system usable in the authentication and continuous re-authentication system.

Referring now to FIG. 6, an example block diagram of a computing system 600 is shown that is useable to implement aspects of the continuous re-authentication system of FIG. 1, including the mobile device 102, the feature vector generator 104, and the feature vector correlator 106 shown and described with reference to FIGS. 1-4. In the embodiment shown, the computing system 600 includes at least one central processing unit ("CPU") 602, a system memory 608, and a system bus 622 that couples the system memory 608 to the CPU 602. The system memory 608 includes a random access memory ("RAM") 610 and a read-only memory ("ROM") 612. A basic input/output system that contains the basic routines that help to transfer information between elements within the computing system 600, such as during startup, is stored in the ROM 612. The computing system 600 further includes a mass storage device 614. The mass storage device 614 stores software instructions and data.

The mass storage device 614 is connected to the CPU 602 through a mass storage controller (not shown) connected to the system bus 622. The mass storage device 614 and its associated computer-readable storage media provide non-volatile, non-transitory data storage for the computing system 600. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 602 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 600.

According to various embodiments of the invention, the computing system 600 may operate in a networked environment using logical connections to remote network devices through a network 624, such as a wireless network, the Internet, or another type of network. The computing system 600 may connect to the network 624 through a network interface unit 604 connected to the system bus 622. It should be appreciated that the network interface unit 604 may also be utilized to connect to other types of networks and remote computing systems. The computing system 600 also includes an input/output controller 606 for receiving and processing input from a number of other devices, including a touch user interface display screen, or another type of input device. Similarly, the input/output controller 606 may provide output to a touch user interface display screen or other type of output device.

As mentioned briefly above, the mass storage device 614 and the RAM 610 of the computing system 600 can store software instructions and data. The software instructions include an operating system 618 suitable for controlling the operation of the computing system 600. The mass storage device 614 and/or the RAM 610 also store software instructions, that when executed by the CPU 602, cause the computing system 600 to provide the functionality discussed in this document. For example, the mass storage device 614 and/or the RAM 610 can store software instructions and software applications 616 that, when executed by the CPU 602, cause the computing system 600 to receive and analyze inventory and demand data.

Figure 7:
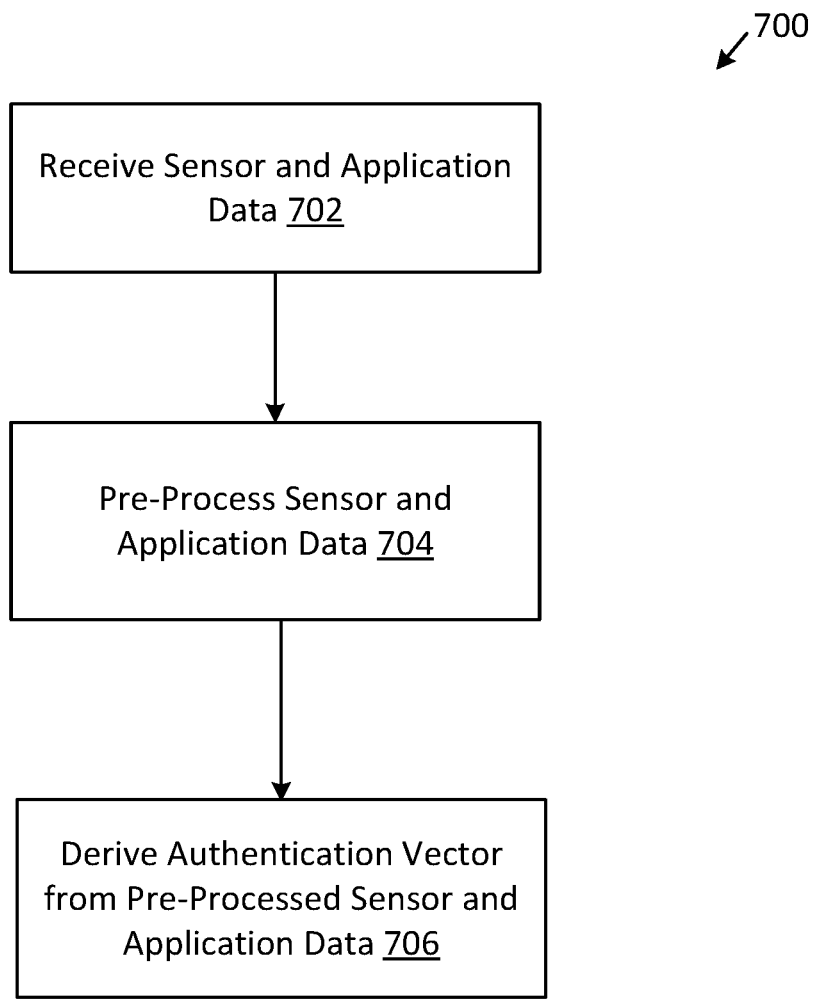
FIG. 7 is a flow chart of an example method of generating an authentication feature vector as used by the continuous re-authentication system

FIG. 7 is a flow chart of an example method 700 of generating an authentication feature vector as used by the continuous re-authentication system to re-authenticate an authorized user of an application operating on a mobile device. In some embodiments, the method 700 is performed by the feature vector generator 104 of the continuous re-authentication system, as depicted in FIGS. 1, 3, and 5.

At operation 702, the feature vector generator receives data from one or more physical sensors, one or one or more static elements associated with a mobile device, and from the application executing on the mobile device. In this example, the mobile device executes an application, and is associated with a user authorized to access the application. As described herein, the mobile device may include physical sensors that provide data about the device itself and even the environment surrounding the device. In one example, the mobile device includes one or more of the following physical sensors: an accelerometer, a gyroscope, a linear accelerator, a magnetometer, a proximity sensor, a gravity sensor, and a light sensor. In other embodiments, other physical sensors may be used, such as a camera that detects and identifies a user's face, or a fingerprint sensor that detects and identifies a user's unique fingerprint. Alternatively or additionally, the feature vector generator may receive data from one or more static elements associated with the mobile device. In one example, static elements may refer to elements that provide data about the mobile device's connections (e.g., connections to Wi-Fi networks or Bluetooth devices). Alternatively or additionally, the feature vector generator may receive data from the application, such as, for example, the user's browsing and purchasing behavior. This may include behavior indicative of how long the user typically views a particular product, how long a user waits to purchase an item after viewing the item, whether the user views alternative images of the product, whether the user reads customer reviews, etc.

At operation 704, the feature vector generator pre-processes the raw sensor data, the static element data, and the application data received at operation 702. In some embodiments, the feature vector generator performs time domain feature extraction to extract relevant information from each of the data streams and transforms that data into the frequency domain.

At operation 706, the feature vector generator derives an n-dimension authentication feature vector from each of the sensors and application from which data is received. The authentication feature vector is unique to the particular authorized user, and describes characteristics of the mobile device while the authorized user is operating the application executing thereon. In some examples, the generated authentication feature vector is stored in a database that may be associated with the feature vector generator or another storage component within the continuous re-authentication system.

Figure 8:
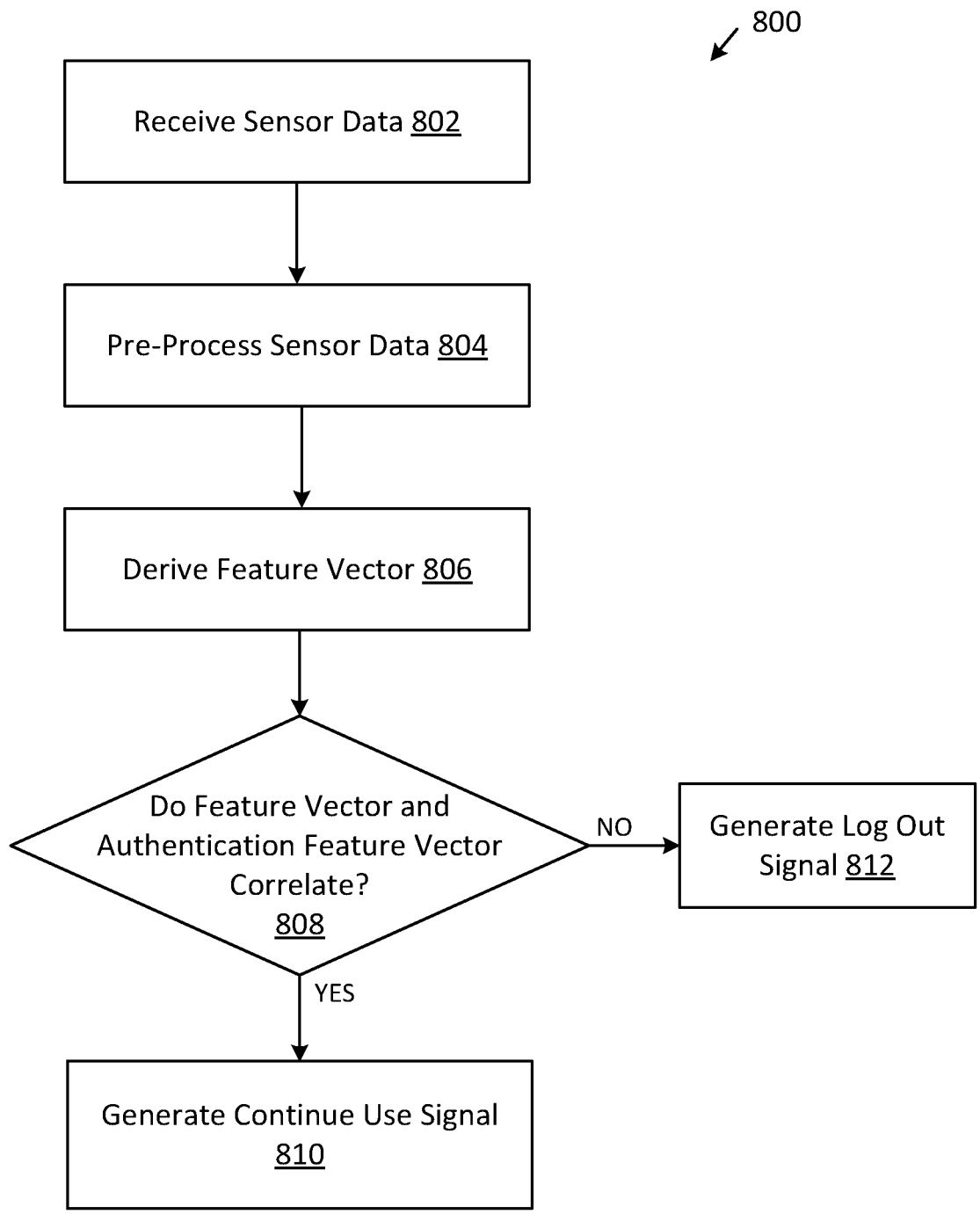
FIG. 8 is a flow chart of an example method of authenticating and re-authenticating an authorized user of an application operating on a mobile device.

FIG. 8 is a flow chart of an example method 800 of re-authenticating an authorized user of an application operating on a mobile device. The method 800 may be performed by the feature vector correlator 106 of the continuous re-authentication system, as depicted in FIGS. 1, 4, and 5.

As described herein, the continuous re-authentication system continuously re-authenticates the user during use of the application 116 executing on the mobile device 102. Continuous re-authentication ensures the application, and any sensitive information stored thereon, is accessed only by the authorized user.

The method 800 begins at operation 802, in which the feature vector correlator receives data from a combination of one or more physical sensors, one or more static elements, and the application executing on the mobile device during operation of the application. In this example, the application operates on the mobile device and is associated with a user authorized to access the application. As described herein, the mobile device may include physical sensors that provide data about the device itself and even the environment surrounding the device. In one example, the mobile device includes one or more of the following physical sensors: an accelerometer, a gyroscope, a linear accelerator, a magnetometer, a proximity sensor, a gravity sensor, and a light sensor. In other embodiments, other physical sensors may be used, such as a camera that detects and identifies a user's face, or a fingerprint sensor that detects and identifies a user's fingerprint. Alternatively or additionally, the feature vector generator may receive data from one or more static elements associated with the mobile device. In one example, static elements may refer to elements that provide data about the mobile device's connections (e.g., connections to Wi-Fi networks or Bluetooth devices). Alternatively or additionally, the feature vector generator may receive data from the application, such as, for example, the user's browsing and purchasing behavior. This may include behavior indicative of how long the user typically views a particular product, how long a user waits to purchase an item after viewing the item, whether the user views alternative images of the product, whether the user reads customer reviews, etc.

At operation 804, the feature vector correlator pre-processes raw sensor, the static element data, and the application data received at operation 802. In some embodiments, the feature vector correlator performs time domain feature extraction to extract relevant information from each of the data streams and transforms that data into the frequency domain.

At operation 806, the feature vector correlator derives an n-dimension feature vector from each of the sensors and application from which data is received. The feature vector is unique to the particular user, describing features of the mobile device while the particular user is operating the application executing thereon.

At operation 808, the feature vector correlator compares the feature vector derived in operation 806 to the authentication feature vector for the authorized user of the mobile device. As described herein, an authentication feature vector has been generated for each authorized user, wherein the authentication feature vector describes typical characteristics of the mobile device during operation of the application by the authorized user. In some embodiments, the authentication feature vector is stored in a database accessible by the feature vector correlator. If it is determined that the feature vector sufficiently correlates to the authentication feature vector, (e.g., YES at operation 808), it is determined that the authorized user is operating the application. Accordingly, at operation 810, the feature vector correlator generates a signal allowing the authorized user to continue operating the application on the mobile device.

Alternatively, if at operation 808 the feature vector correlator compares the feature vector to the authentication feature vector and it is determined that the feature vector does not sufficiently correlate to the authentication feature vector (e.g., NO at operation 810), it is determined that an unauthorized user is operating the application. Accordingly, at operation 812, the feature vector correlator generates a log out signal that is sent to the mobile device. The log out signal will automatically log the application out of the mobile device so that the unauthorized user cannot continue to operate the application.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A method of authenticating and re-authenticating an authorized user of an application operating on a mobile device, the method comprising:
   receiving, from the application, browsing and purchasing behavior of the authorized user;
   receiving sensor data from the mobile device, wherein the sensor data includes data from at least one sensor associated with the mobile device;
   processing the sensor data concurrently with the browsing and purchasing behavior, wherein processing the sensor data includes:
   sampling the sensor data, wherein the sensor data is derived from one or more sensors;
   synchronizing the sensor data;
   segmenting the synchronized sensor data into a plurality of overlapping fixed-size windows;
   based on the plurality of overlapping fixed-sized windows generating an n-dimensional feature vector in a time domain; and
   translating the n-dimensional feature vector into a frequency domain;
   generating a feature vector from the n-dimensional feature vector translated into the frequency domain and the browsing and purchasing behavior;
   obtaining an authentication feature vector associated with the authorized user of the application;
   comparing the feature vector with the authentication feature vector; and
   based on a determination that the feature vector sufficiently correlates to the authentication feature vector, continuing operation of the application.

2. The method of claim 1, wherein the at least one sensor associated with the mobile device further comprises at least one of: an accelerometer, a gyroscope, a linear acceleration sensor, a magnetometer, a proximity sensor, a gravity sensor, a light sensor, and a global positioning system.

3. The method of claim 1, further comprising:
   based on a determination that the feature vector does not sufficiently correlate to the authentication feature vector, generating a signal indicating an unauthorized user is operating the mobile device.

4. The method of claim 3, further comprising:
   displaying, on a display of the mobile device, a prompt to enter an authorized user identification and password;
   in response to receiving a correct authorized user identification and password, generating a signal indicating the authorized user is operating the mobile device.

5. The method of claim 4, further comprising:
   in response to receiving an incorrect authorized user identification and password, generating a signal to automatically log out of the application; and
   generating a notification message indicating an unauthorized user accessed the application.

6. The method of claim 1, further comprising:
   generating the authentication feature vector from previously processed sensor data; and
   providing the authentication feature vector to authorize a user of the application.

7. The method of claim 1, wherein the sensor data further includes data from at least one static element associated with the mobile device.

8. The method of claim 7, wherein the at least one static element associated with the mobile device further comprises at least one of: a Wi-Fi chip and a Bluetooth chip.

9. The method of claim 1, wherein translating the extracted one or more time domain features into the frequency domain further comprises:
   using a fast Fourier Transform for each of the one or more segmented time windows to convert the sensor data into the frequency domain.

10. The method of claim 1, wherein the authentication feature vector is a vector having n numerical features that represent features of the sensor.

11. The method of claim 10, wherein the authentication feature vector uniquely describes the authorized user's interactions with the mobile device during operation of the application.

12. A non-transitory computer-readable storage medium comprising computer-executable instructions stored thereon which, when executed by a programmable circuit of a computing system, cause the computing system to perform a method of authenticating and re-authenticating an authorized user of an application operating on a mobile device, the method comprising:
   receiving, from the application, browsing and purchasing behavior of the authorized user;
   receiving sensor data from the mobile device, wherein the sensor data includes data from at least one sensor associated with the mobile device;
   processing the sensor data concurrently with the browsing and purchasing behavior, wherein processing the sensor data includes:
   sampling the sensor data, wherein the sensor data is derived from one or more sensors;
   synchronizing the sensor data;
   segmenting the synchronized sensor data into a plurality of overlapping fixed-size windows;
   based on the plurality of overlapping fixed-sized windows generating an n-dimensional feature vector in a time domain; and
   translating the n-dimensional feature vector into a frequency domain;
   generating a feature vector from the n-dimensional feature vector translated into the frequency domain and the browsing and purchasing behavior;
   obtaining an authentication feature vector associated with the authorized user of the application;
   comparing the feature vector with the authentication feature vector; and based on a determination that the feature vector sufficiently correlates to the authentication feature vector, continuing operation of the application.

13. The non-transitory computer-readable storage medium of claim 12, wherein the at least one sensor associated with the mobile device further comprises at least one of: an accelerometer, a gyroscope, a linear acceleration sensor, a magnetometer, a proximity sensor, a gravity sensor, a light sensor, and a global positioning system.

14. The non-transitory computer-readable storage medium of claim 12, further comprising:
based on a determination that the feature vector does not sufficiently correlate to the authentication feature vector, generating a signal indicating an unauthorized user is operating the mobile device.

15. The non-transitory computer-readable storage medium of claim 14, further comprising:
displaying, on a display of the mobile device, a prompt to enter an authorized user identification and password;
in response to receiving a correct authorized user identification and password, generating a signal indicating the authorized user is operating the mobile device.

16. The non-transitory computer-readable storage medium of claim 15, wherein
in response to receiving an incorrect authorized user identification and password, generating a signal to automatically log out of the application; and
generating a notification message indicating an unauthorized user accessed the application.

* * * * *